(12) United States Patent
Peterson et al.

(10) Patent No.: US 12,130,354 B2
(45) Date of Patent: Oct. 29, 2024

(54) METHOD AND APPARATUS FOR PROTECTING COMPONENTS FROM ELECTROMAGNETIC ENERGY

(71) Applicant: L3Harris Technologies, Inc., Melbourne, FL (US)

(72) Inventors: Brittney Peterson, Santa Rosa, CA (US); Daniel Fluitt, Windsor, CA (US)

(73) Assignee: L3Harris Technologies, Inc., Melbourne, FL (US)

( * ) Notice: Subject to any disclaimer, the term of this patent is extended or adjusted under 35 U.S.C. 154(b) by 575 days.

(21) Appl. No.: 17/482,017

(22) Filed: Sep. 22, 2021

(65) Prior Publication Data
US 2023/0092263 A1    Mar. 23, 2023

(51) Int. Cl.
*G01S 13/86* (2006.01)
*H01Q 1/22* (2006.01)
*H01Q 1/40* (2006.01)
*H01Q 1/52* (2006.01)

(52) U.S. Cl.
CPC .............. *G01S 13/867* (2013.01); *H01Q 1/22* (2013.01); *H01Q 1/405* (2013.01); *H01Q 1/526* (2013.01)

(58) Field of Classification Search
None
See application file for complete search history.

(56) References Cited

U.S. PATENT DOCUMENTS

| | | | |
|---|---|---|---|
| 8,471,470 | B1 | 6/2013 | Wedding |
| 10,074,907 | B2 * | 9/2018 | Ding ................... H01Q 1/3233 |
| 11,188,750 | B1 * | 11/2021 | Ma ........................ G06V 10/30 |
| 2014/0159942 | A1 | 6/2014 | Shi et al. |
| 2015/0123838 | A1 * | 5/2015 | Shi ........................ G01S 13/867 |
| | | | 342/70 |

FOREIGN PATENT DOCUMENTS

CA        2176167 A1    11/1996

OTHER PUBLICATIONS

ARC Techologies, "Tehnical Data Sheet DD-11393", 1 page (Feb. 2019).
Imsar, "Democratizing Radar",https://www.imsar.com/, (2021).
General Atomics Aeronautical, "Lynx Multi-Mode Radar; Increased Capability for Manned and Unmanned Missions", https://www.ga-asi.com/images/products/sensor_systems/pdf/LynxSAR021915.pdf?force_isolation=true, 2 pages (2015).
(Continued)

*Primary Examiner* — Whitney Moore
(74) *Attorney, Agent, or Firm* — Edell, Shapiro & Finnan, LLC

(57) ABSTRACT

In an embodiment, a radar or other system emitting electromagnetic energy is disposed with an optical system or other imaging system in a common housing. A shielding device or shroud protects the optical or other imaging system from the electromagnetic energy emitted from the radar system. The shielding device captures and dissipates electromagnetic signals reflected from a radome in accordance with structural geometry of the shielding device that may be covered with a radiation-absorbent material (RAM) or coating. The shielding device geometry includes angular faces configured to dissipate the electromagnetic signals.

20 Claims, 10 Drawing Sheets

(56) References Cited

OTHER PUBLICATIONS

Kim, SH, et al., "VISAR: A 235 GHz radar for airborne applications", IEEE Radar Conference (RadarConf18), pp. 1549-1554, doi: 10.1109/RADAR.2018.837879 (2018).
Stratasys, "Antero 840CN03; FDM Thermoplastic Filament Data Sheet", ISO 9001:2015 Certified; 16 pages (2020).
Thales, "I-Master; Ground Breaking Lightweight Surveillance Radar", https://www.thalesgroup.com/en/countries/europe/united-kingdom/markets-we-operate/defence/air-systems-uk/isr-air/imaster, 13 pages (2021).

* cited by examiner

METHOD AND APPARATUS FOR PROTECTING COMPONENTS FROM ELECTROMAGNETIC ENERGY

TECHNICAL FIELD

The present disclosure relates to protecting components from electromagnetic energy and, more specifically, to shielding an optical or other imaging system from electromagnetic energy emitted from a radar or other system disposed with the optical system in a common housing.

BACKGROUND

A Faraday cage blocks electromagnetic fields, and may be formed by conductive materials. An external electrical field distributes electric charges within the conductive materials of a Faraday cage in a manner that cancels an effect of the external electrical field in an interior of the Faraday cage. A typical gimbal of an optical system uses a mechanical structure and various grounding techniques to establish a Faraday cage around a payload (including the optical system) and other electronics to prevent them from being damaged. However, the Faraday cage of the gimbal is limited to protecting the payload and other electronics from external sources.

DESCRIPTION OF EXAMPLE EMBODIMENTS

Overview

Figure 1:
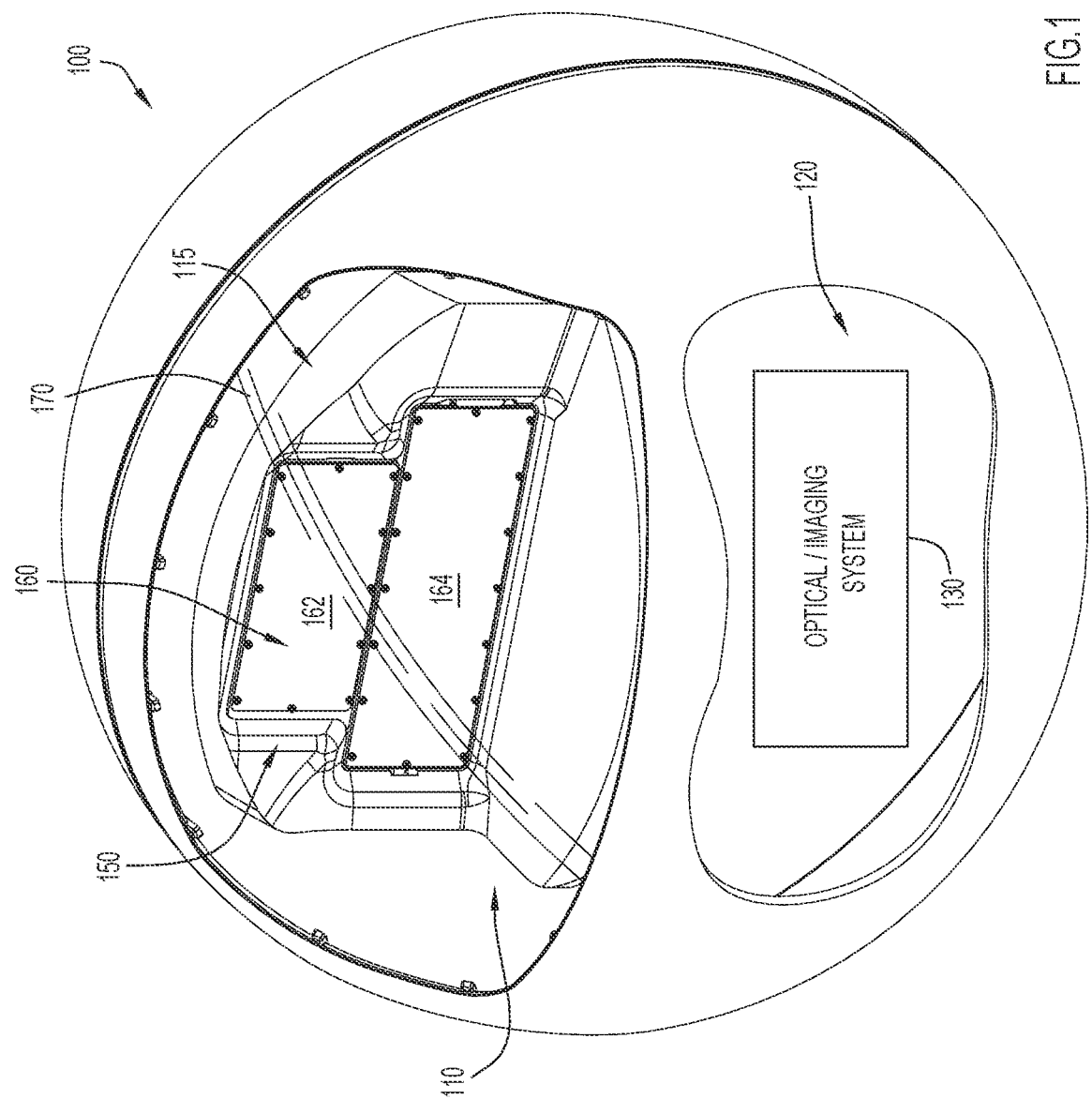
FIG. 1 is a partial cut-away view in perspective of a radar system and an optical system residing within a common housing according to an embodiment of the present disclosure.

In an embodiment, a shielding device or shroud protects an optical or other imaging system from electromagnetic energy emitted from a radar or other system emitting electromagnetic energy disposed with the optical system in a common housing. This prevents the optical system from being vulnerable from both internal and external electromagnetic interference (EMI) sources. The shielding device captures and dissipates electromagnetic signals reflected from a radome in accordance with structural geometry of the shielding device that may be covered with a radiation-absorbent material (RAM) or coating. This protects other components and electronics from being damaged by EMI. The particular structural geometry is constrained by shapes of transmit and receive antennas of the radar, payload volume constraints, radar antenna type, and optical system payload components. The shielding device geometry includes angular faces configured to dissipate the electromagnetic signals.

EXAMPLE EMBODIMENTS

A typical gimbal of an optical system uses a mechanical structure and various grounding techniques to establish a Faraday cage around a payload (including the optical system) and other electronics to prevent them from being damaged. However, the Faraday cage of the gimbal is limited to protecting the payload and other electronics from external sources.

An embodiment of the present disclosure incorporates into the payload of the gimbal a radar or other system emitting radio frequency (RF) or other electromagnetic energy. The gimbal maintains orientation of a free-standing payload through several degrees of freedom and isolates vibration. Since the radar requires a radome to be included in the Faraday cage of the gimbal to enable transmission and reception of the electromagnetic energy, the possibility of RF interference from outside sources increases, and signals from the radar system could reflect back into the payload and damage the electronics. Although the concept of using radiation-absorbent materials (RAM) to shield electronic components and sensors from external radar emissions is known, these materials are fixedly attached to housing walls which is not suitable when the radar system moves relative to the walls during operation of the gimbal to maintain a certain orientation. For example, the radar system may change orientations relative to the fixed materials during gimbal operation, thereby forming gaps in the protection and/or resulting in the radar system being improperly oriented relative to the materials that enables radar emissions to reach and damage the optical system.

Accordingly, an embodiment of the present disclosure provides a shielding device or shroud that protects the optical or other imaging system from electromagnetic signals of the radar or other system emitting electromagnetic energy disposed within the payload of the gimbal. This prevents the optical system from being vulnerable from both internal and external electromagnetic interference (EMI) sources. In addition, the shielding device or shroud is attached to an antenna assembly of the radar system (with dimensions insufficient to reach and contact housing walls) to enable the shielding device to move in various degrees of freedom and maintain its orientation relative to the radar system during gimbal operation for protecting the optical system. For example, the shielding device may leave a gap between its geometry and the housing walls to accommodate the movement of the payload (fine pointing and isolator travel). This gap may be approximately 0.5 inches driven by the isolator travel. However, the gap may vary depending on the operation of the gimbal. The shielding device includes structural aspects based on a superposition of various radio frequency (RF) shielding concepts and antenna array design with a goal of shielding internal electronics of the optical system while maintaining optimal radar system performance.

An example housing of an embodiment of the present disclosure is illustrated in FIG. 1. Initially, housing 100 is generally spherical and includes a radar chamber 110 and an optical chamber 120. The housing preferably includes or forms part of a gimbal (not shown) for maintaining orientation of the radar system and optical system (e.g., as a vehicle containing the gimbal and housing moves). The radar chamber includes a radar system 115 with an antenna assembly 160. The radar system may be implemented by any conventional or other type of radar system emitting radio frequency (RF) or other electromagnetic signals (e.g., synthetic aperture radar (SAR), etc.) to detect any types of objects. Alternatively, the radar chamber may house any detection or other system emitting radio frequency (RF) or other electromagnetic signals. A radome 170 is positioned coincident radar chamber 110 to enable transmission and reception of electromagnetic signals by radar system 115 from the radar chamber. Antenna assembly 160 may include one or more antennas for transmitting and/or receiving radio frequency (RF) or other electromagnetic signals. By way of example, antenna assembly 160 includes a transmit antenna 162 for transmitting RF signals, and a receive antenna 164 disposed below the transmit antenna for receiving RF signals. However, the housing may be of any suitable shape, where the radar and optical chambers may be arranged in any fashion (e.g., the radar chamber may be above or below the optical chamber, etc.). For example, the radar and optical systems are preferably disposed in opposite ends of a payload volume, as opposed to sandwiching the radar system with the optical system which would require additional shielding. Further, the gimbal may be implemented by any conventional or other gimbal operating in any quantity of degrees of freedom to maintain a payload in a certain orientation.

Optical chamber 120 may be disposed below radar chamber 110 and houses an optical system 130 for generating images. The optical system may be implemented by any conventional or other passive or active optical system with sensors and components (e.g., cameras, receivers, transmitters, etc.) configured for light energy in the visible and/or non-visible spectrum (e.g., optical/camera system, electro-optical/infra-red system (EOIR), infra-red system, etc.)).

The radar system and optical system may move relative to the housing in several degrees of freedom during gimbal operation to maintain a proper orientation (e.g., as a vehicle containing the gimbal moves) for operation of the radar and optical systems. A shielding device or shroud 150 is attached to antenna assembly 160 to reflect and/or absorb RF or other electromagnetic signals that may damage the optical system within optical chamber 120. The shielding device moves as the radar system moves through several degrees of freedom to maintain a certain orientation relative to the radar system for reflecting and/or absorbing RF signals.

Figure 2A:
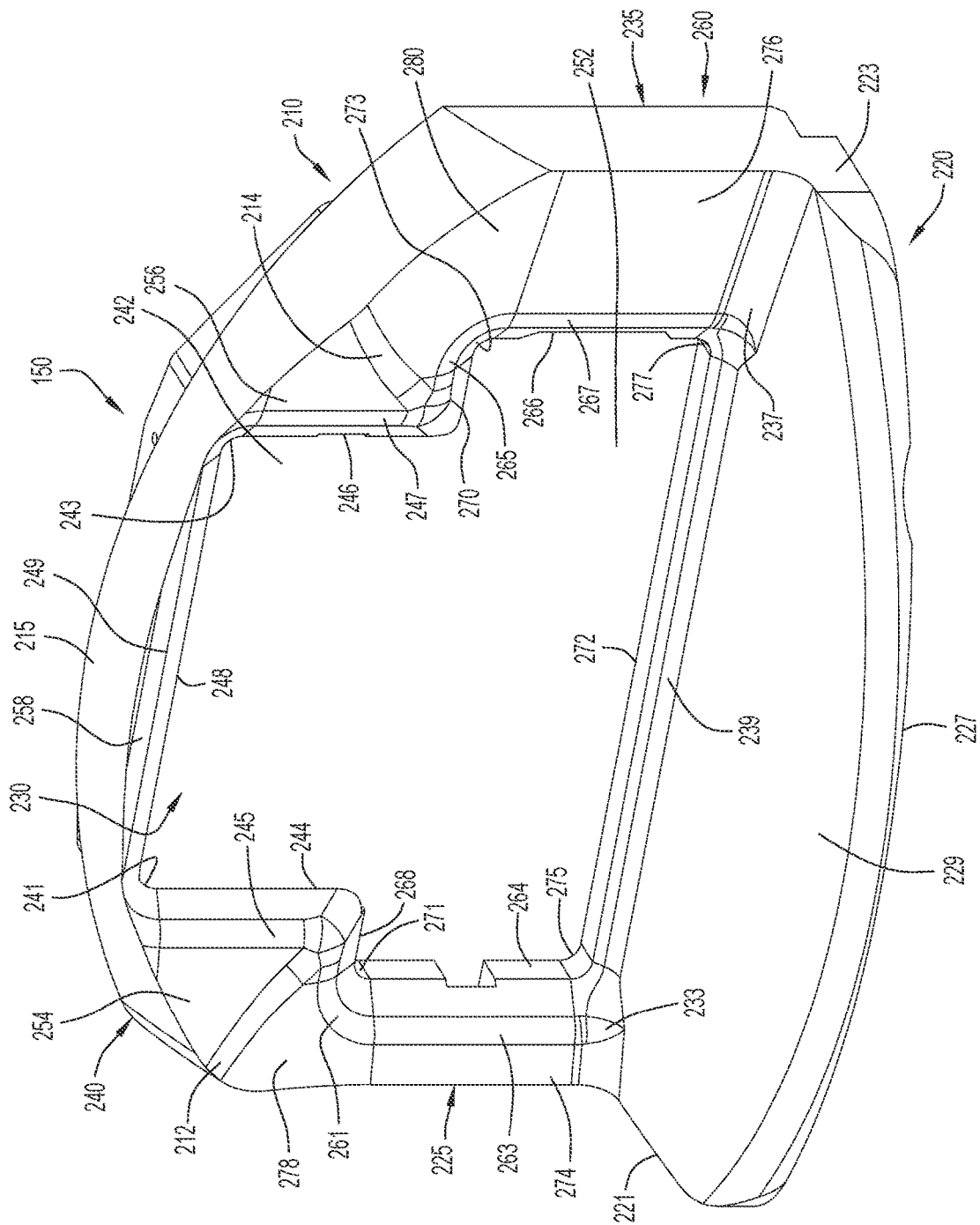
FIG. 2A is view in perspective of a shielding device for reflecting and absorbing electromagnetic energy according to an embodiment of the present disclosure.
Figure 2B:
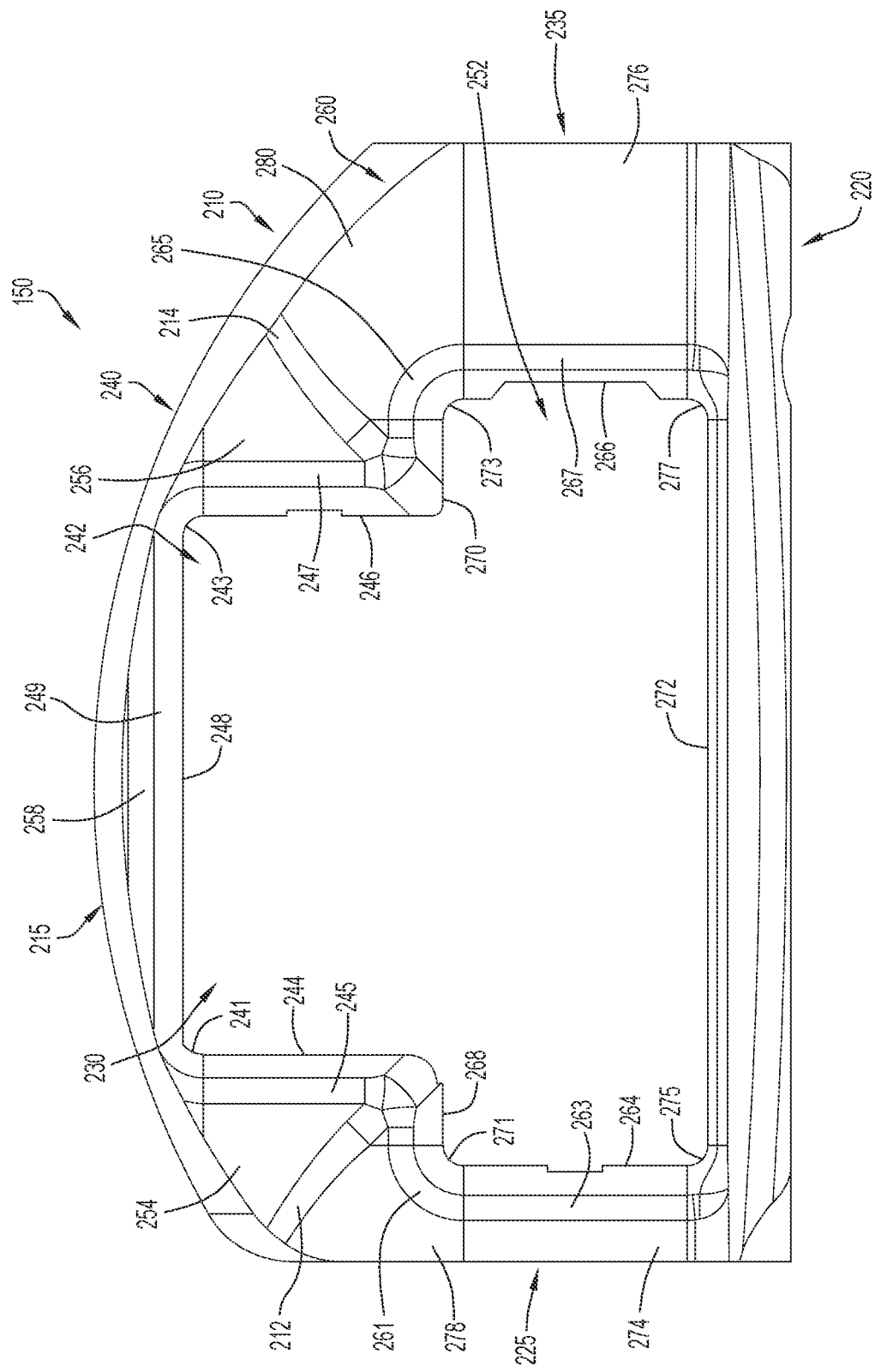
FIG. 2B is a front view in elevation of the shielding device of FIG. 2A according to an embodiment of the present disclosure.
Figure 3:
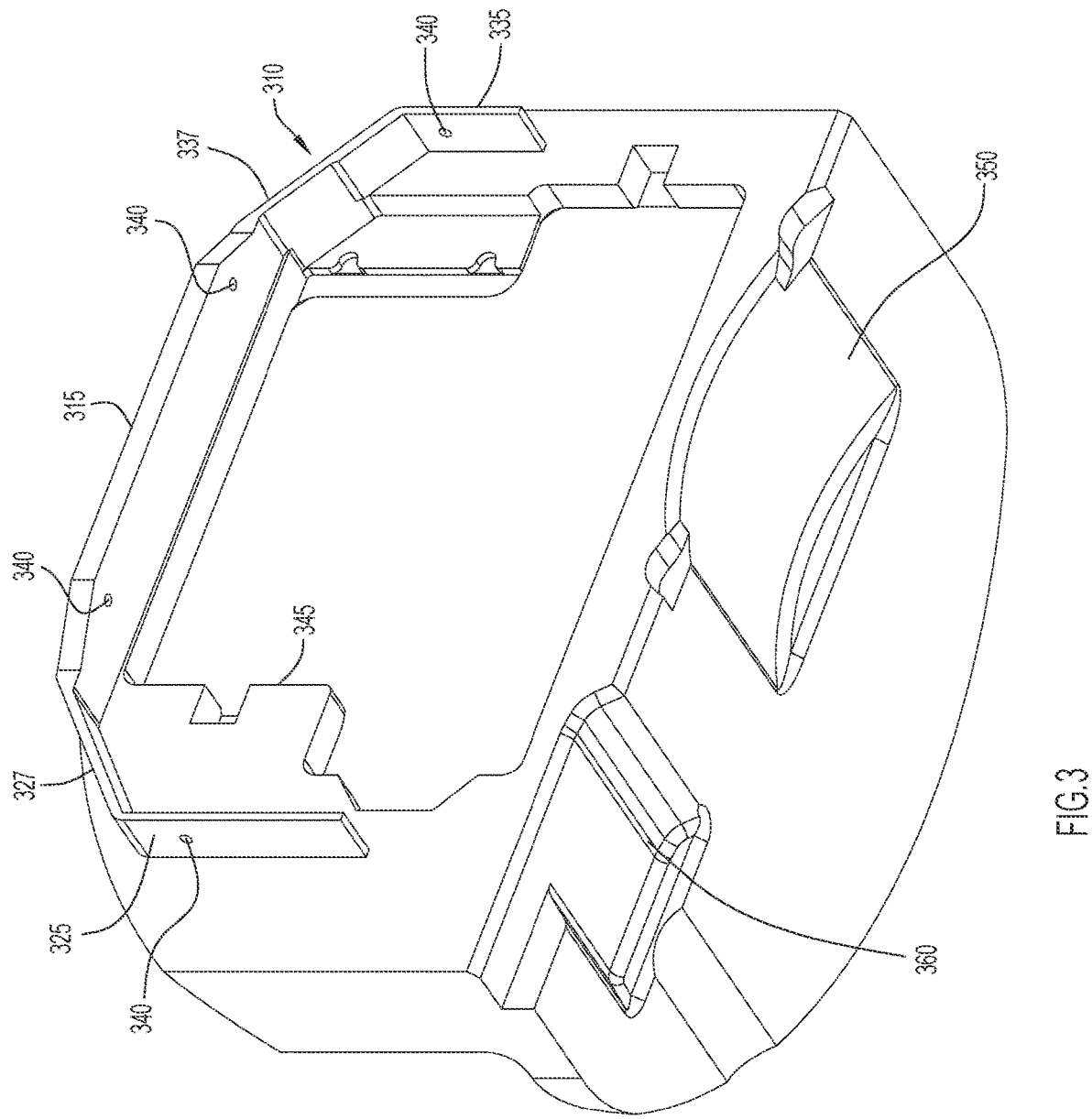
FIG. 3 is a rear view in perspective of the shielding device of FIG. 2A according to an embodiment of the present disclosure.

Referring to FIGS. 2A, 2B, and 3, shielding device 150 includes an antenna engaging panel or plate 210 and a base panel or plate 220 attached to a bottom portion of the antenna engaging panel. By way of example, shielding device 150 is configured to account for a main beam from the radar system and first sidelobe regions of the main beam. However, the shielding device may be configured for additional sidelobe regions based on radar performance requirements. The antenna engaging panel includes an upper shielding region 240, a lower shielding region 260, ridges 212, 214 transitioning between upper and lower shielding regions 240, 260, and an antenna assembly aperture 230 defined in the antenna engaging panel 210 to receive antennas of antenna assembly 160. The antenna assembly aperture includes an upper antenna aperture 242 residing in upper shielding region 240 and a lower antenna aperture 252 disposed below and adjoining upper antenna aperture 242 in lower shielding region 260. By way of example, upper antenna aperture 242 receives transmit antenna 162, while receive antenna 164 is disposed in lower antenna aperture 252.

The boundaries of antenna engaging panel 210 are defined by a top edge 215, and side edges 225, 235. Top edge 215 includes a curved configuration and extends between side edges 225, 235. Side edge 225 extends from base panel 220 to a position coincident an intermediate portion of upper antenna aperture 242 for attachment to top edge 215. The junction where side edge 225 is attached to top edge 215 is curved and smooth to prevent directional scattering of electromagnetic energy. These features also protect the optical system from potential harmful levels of transmit and receive energy being directed in any particular way. Side edge 235 extends from base panel 220 substantially parallel to side edge 225 to a position coincident a top portion of lower antenna aperture 252 and/or a bottom portion of upper aperture 242 (e.g., a location where the upper and lower apertures adjoin) for attachment to top edge 215. Accordingly, a length dimension of side edge 225 is greater than the length dimension of side edge 235. However, side edges 225, 235 may be parallel or extend at any desired orientation or angle relative to each other.

Upper shielding region 240 encompasses an area extending from ridges 212, 214 to an upper boundary defined by top edge 215. Upper antenna aperture 242 is defined in upper shielding region 240 below top edge 215 and between ridges 212, 214. The upper antenna aperture has boundaries defined by generally rectangular side walls 244, 246, and a generally rectangular top wall 248. However, the walls 244, 246, and 248 may be of any shape. The bottom portion of upper antenna aperture 242 is open and adjoins a partially open top portion of lower antenna aperture 252. The side walls and top wall defining upper antenna aperture 242 extend outward from upper antenna aperture 242 (e.g., away from and in front of transmit antenna 162) at an angle of approximately forty-five degrees relative to an axis perpendicular to the upper antenna aperture (or transmit antenna 162) in order to reflect signals of the radar system as described below. However, the side and top walls defining upper antenna aperture 242 may extend at any desired angle, preferably in the range of thirty-five to fifty-five degrees. This angled feature surrounding a profile of transmit antenna 162 impedes unwanted scattered energy from entering the receive antenna. This region extends the ground plane to reduce edge effects of antenna arrays. Upper antenna aperture 242 is generally rectangular and includes rounded corners 241, 243 where top wall 248 adjoins or is attached to side walls 244, 246.

Side wall 244 extends outward from upper antenna aperture 242 as described above and adjoins or is attached to an upper region surface 254. The upper region surface is generally triangular and extends from side wall 244 (in a direction toward side edge 225) at an angle of approximately seventy-five degrees relative to an axis perpendicular to the upper antenna aperture (or transmit antenna 162) in order to reflect signals of the radar system as described below. However, upper region surface 254 may be of any shape and extend at any desired angle, preferably in the range of sixty-five to ninety degrees. This angular surface shields sensors of the optical system from reflected radio frequency (RF) or other electromagnetic energy entering through the radome. The angular surface may further control (or reduce) a signature back to other radar systems, thereby reducing a probability of detecting radar system 115. Upper region surface 254 resides in an area defined by side wall 244, top edge 215 of antenna engaging panel 210, and ridge 212. A ridge 245 is formed where side wall 244 meets upper region surface 254 to transition between the different angular orientations of side wall 244 and upper region surface 254. Ridge 245 is curved and smooth to prevent directional scattering of electromagnetic energy. These features also protect the optical system from potential harmful levels of transmit and receive energy being directed in any particular way. Upper region surface 254 includes a curved configuration to form ridge 212 at a portion transitioning from upper shielding region 240 to lower shielding region 260.

Side wall 246 extends outward from upper antenna aperture 242 as described above and adjoins or is attached to an upper region surface 256. Upper region surface 256 is generally triangular and extends from side wall 246 (in a direction toward side wall 235) at an angle of approximately seventy-five degrees relative to an axis perpendicular to the upper antenna aperture (or transmit antenna 162) in order to reflect signals of the radar system as described below. However, upper region surface 256 may be of any shape and extend at any desired angle, preferably in the range of sixty-five to ninety degrees. This angular surface shields sensors of the optical system from reflected radio frequency (RF) or other electromagnetic energy entering through the radome. The angular surface may further control (or reduce) a signature back to other radar systems, thereby reducing a probability of detecting radar system 115. Upper region surface 256 resides in an area defined by side wall 246, top edge 215 of antenna engaging panel 210, and ridge 214. A ridge 247 is formed where side wall 246 meets upper region surface 256 to transition between the different angular orientations of side wall 246 and upper region surface 256. Ridge 247 is curved and smooth to prevent directional scattering of electromagnetic energy. These features also protect the optical system from potential harmful levels of transmit and receive energy being directed in any particular way. Upper region surface 256 includes a curved configuration to form ridge 214 at a portion transitioning from upper shielding region 240 to lower shielding region 260.

Top wall 248 extends outward from upper antenna aperture 242 as described above and adjoins or is attached to an upper region surface 258. Upper region surface 258 is generally semi-elliptical and extends from the top wall toward top edge 215 at an angle of approximately seventy-five degrees relative to an axis perpendicular to the upper antenna aperture (or transmit antenna 162) in order to reflect signals of the radar system as described below. This angular surface shields sensors of the optical system from reflected radio frequency (RF) or other electromagnetic energy entering through the radome. The angular surface may further control (or reduce) a signature back to other radar systems, thereby reducing a probability of detecting radar system 115. Upper region surface 258 resides in an area defined by top wall 248 and top edge 215 of antenna engaging panel 210. A ridge 249 is formed where top wall 248 meets upper region surface 258 to transition between the different angular orientations of top wall 248 and upper region surface 258. Ridge 249 is curved and smooth to prevent directional scattering of electromagnetic energy. These features also protect the optical system from potential harmful levels of transmit and receive energy being directed in any particular way. However, upper region surface 258 may be of any shape and extend at any desired angle, preferably in the range of sixty-five to ninety degrees.

Lower shielding region 260 encompasses an area extending from ridges 212, 214 to a boundary defined by base panel 220. Lower antenna aperture 252 is defined in lower shielding region 260 below upper antenna aperture 242 and between side edges 225, 235. The lower antenna aperture has boundaries defined by generally rectangular side walls 264, 266, generally rectangular top walls 268, 270, and a generally rectangular bottom wall 272. However, the side, top, and bottom walls defining lower antenna aperture 252 may be of any shape. The top portion of lower antenna aperture 252 is partially open and adjoins an open bottom portion of lower antenna aperture 252. The side walls and top walls defining lower antenna aperture 252 extend outward from lower antenna aperture 252 (e.g., away from and in front of receive antenna 164) at an angle of approximately forty-five degrees relative to an axis perpendicular to the lower antenna aperture (or receive antenna 164) in order to reflect signals of the radar system as described below. However, the side and top walls defining lower antenna aperture 252 may extend at any desired angle, preferably in the range of thirty-five to fifty-five degrees. This angled feature surrounding a profile of receive antenna 164 impedes unwanted scattered energy from entering the receive antenna. Lower antenna aperture 252 is generally rectangular and includes rounded corners 271, 273 where top walls 268, 270 respectively adjoin or are attached to side walls 264, 266 and rounded corners 275, 277 where side walls 264, 266 respectively adjoin or are attached to bottom wall 272.

Top wall 268 extends outward from lower antenna aperture 252 as described above, and adjoins or is attached to side wall 264 to form rounded corner 271 as described above. Rounded corner 271 adjoins or is attached to a lower region surface 278 that is generally trapezoidal and extends from rounded corner 271 toward side edge 225 at an angle of approximately seventy-five degrees relative to an axis perpendicular to the lower antenna aperture (or receive antenna 164) in order to reflect signals of the radar system as described below. However, lower region surface 278 may be of any shape and extend at any desired angle, preferably in the range of sixty-five to ninety degrees. This angular surface shields sensors of the optical system from reflected radio frequency (RF) or other electromagnetic energy entering through the radome. The angular surface may further control (or reduce) a signature back to other radar systems, thereby reducing a probability of detecting radar system 115. Lower region surface 278 resides in an area defined by rounded corner 271, side edge 225 of antenna engaging panel 210, and ridge 212. A ridge 261 is formed where top wall 268 meets lower region surface 278 to transition between the different angular orientations of top wall 268 and upper region surface 278. Ridge 261 is curved and smooth to prevent directional scattering of electromagnetic energy. These features also protect the optical system from potential harmful levels of transmit and receive energy being directed in any particular way. Lower region surface 278 includes a curved configuration to form ridge 212 at a portion transitioning from upper shielding region 240 to lower shielding region 260.

Side wall 264 extends outward from lower antenna aperture 252 as described above and adjoins or is attached to a lower region surface 274. The lower region surface is generally rectangular and extends from side wall 264 toward side edge 225 at an angle of approximately seventy-five degrees relative to an axis perpendicular to the lower antenna aperture (or receive antenna 164) in order to reflect signals of the radar system as described below. However, lower region surface 274 may be of any shape and extend at any desired angle, preferably in the range of sixty-five to ninety degrees. This angular surface shields sensors of the optical system from reflected radio frequency (RF) or other electromagnetic energy entering through the radome. The angular surface may further control (or reduce) a signature back to other radar systems, thereby reducing a probability of detecting radar system 115. Lower region surface 274 resides in an area defined by side wall 264 and side edge 225 of antenna engaging panel 210. A ridge 263 is formed where side wall 264 meets lower region surface 274 to transition between the different angular orientations of side wall 264 and lower region surface 274. Ridge 263 is curved and smooth to prevent directional scattering of electromagnetic energy. These features also protect the optical system from potential harmful levels of transmit and receive energy being directed in any particular way.

Top wall 270 extends outward from lower antenna aperture 252 and adjoins or is attached to side wall 266 to form rounded corner 273 as described above. Rounded corner 273 adjoins or is attached to a lower region surface 280 that is generally trapezoidal and extends from rounded corner 273 (in a direction toward side edge 235) at an angle of approximately seventy-five degrees relative to an axis perpendicular to the lower antenna aperture (or receive antenna 164) in order to reflect signals of the radar system as described below. However, lower region surface 280 may be of any shape and extend at any desired angle, preferably in the range of sixty-five to ninety degrees. This angular surface shields sensors of the optical system from reflected radio frequency (RF) or other electromagnetic energy entering through the radome. The angular surface may further control (or reduce) a signature back to other radar systems, thereby reducing a probability of detecting radar system 115. Lower region surface 280 resides in an area defined by rounded corner 273, top and side edges 215, 235 of antenna engaging panel 210, and ridge 214. A ridge 265 is formed where top wall 270 meets lower region surface 280 to transition between the different angular orientations of top wall 268 and lower region surface 280. Ridge 265 is curved and smooth to prevent directional scattering of electromagnetic energy. These features also protect the optical system from potential harmful levels of transmit and receive energy being directed in any particular way. Lower region surface 280 includes a curved configuration to form ridge 214 at a portion transitioning from upper shielding region 240 to lower shielding region 260.

Side wall 266 extends outward from lower antenna aperture 252 as described above and adjoins or is attached to a lower region surface 276. Lower region surface 276 is generally rectangular and extends from side wall 266 toward side edge 235 at an angle of approximately seventy-five degrees relative to an axis perpendicular to the lower antenna aperture (or receive antenna 164) in order to reflect signals of the radar system as described below. However, lower region surface 276 may be of any shape and extend at any desired angle, preferably in the range of sixty-five to ninety degrees. This angular surface shields sensors of the optical system from reflected radio frequency (RF) or other electromagnetic energy entering through the radome. The angular surface may further control (or reduce) a signature back to other radar systems, thereby reducing a probability of detecting radar system 115. Lower region surface 276 resides in an area defined by side wall 266 and side edge 235 of antenna engaging panel 210. A ridge 267 is formed where side wall 266 meets lower region surface 276 to transition between the different angular orientations of side wall 266 and lower region surface 276. Ridge 267 is curved and smooth to prevent directional scattering of electromagnetic energy. These features also protect the optical system from potential harmful levels of transmit and receive energy being directed in any particular way.

Antenna engaging panel 210 (FIG. 3) enables shielding device 150 to be mounted on antenna assembly 160. A bracket assembly 310 is disposed on a rear surface of the antenna engaging panel. The bracket is configured to engage a mounting plate (not shown) for attachment of the shielding device to the antenna assembly. Bracket assembly 310 includes top wall 315, side walls 325, 335, angled walls 327, 337, and a partial rear wall 345. Angled wall 327 is disposed between side wall 325 and top wall 315 and oriented at an angle to produce a cut-off corner. Similarly, angled wall 337 is disposed between side wall 335 and top wall 315 and oriented at an angle to produce a cut-off corner. Rear wall 345 extends from side wall 325 and angled wall 327 in a direction toward side wall 335 to provide a partial enclosure for engaging the mounting plate (not shown). Top wall 315 and side walls 325, 335 include holes 340 to receive fasteners for attaching the shielding device to the mounting plate (not shown). The mounting plate is attached to antenna assembly 160 to secure the shielding device to radar system 115.

Base panel 220 (FIGS. 2A and 2B) is attached to and extends from a lower portion of antenna engaging panel 210 at an angle slightly less than ninety degrees relative to an axis perpendicular to antenna aperture 230. However, the base panel may extend at any desired angle, but preferably in the range of seventy-five to ninety degrees. The base panel includes side edges 221, 223, and a distal edge 227. Side edge 221 extends from a bottom portion of side edge 225 of lower shielding region 260, while side edge 223 extends from a bottom portion of side edge 235 of lower shielding region 260 substantially parallel to side edge 221. However, side edges 221, 223 may be parallel or extend at any desired orientation or angle relative to each other. Side edge 221 includes a length dimension greater than the length dimension of side edge 223, where distal edge 227 includes a curved configuration and extends from the distal end of side edge 221 to the distal end of side edge 223. The exterior surface of distal edge 227 is curved and smooth to prevent directional scattering of electromagnetic energy. These features also protect the optical system from potential harmful levels of transmit and receive energy being directed in any particular way.

In addition, transition regions 233, 237, and 239 are provided at respective locations where lower region surface 274 adjoins or is attached to base panel 220, lower region surface 276 adjoins or is attached to base panel 220, and bottom wall 272 adjoins or is attached to base panel 220. The transition regions provide a transition between antenna engaging panel 210 and base panel 220, and are curved and smooth to prevent directional scattering of electromagnetic energy. These features also protect the optical system from potential harmful levels of transmit and receive energy being directed in any particular way.

The side and distal edges of base panel 220 define an area for a generally rectangular surface 229 for reflecting and/or or absorbing electromagnetic energy as described below. Surface 229 may be of any shape and accounts for energy that could potentially reach components of the optical system from the transmit antenna radiating, external reflected energy, and energy reflected from the radome (e.g., surface 229 may absorb rays from main and first sidelobe energy waves).

Further, the thickness of base panel 220 gradually tapers distally in order to provide structural integrity for the base panel. An underlying surface of base panel 220 (FIG. 3) includes a plurality of recesses 350, 360 defined therein toward the proximal portion of the base panel. The recesses are configured to at least partially receive components of the optical system for placement of the shielding device within the housing.

Shielding device 150 is preferably constructed using any conventional or other three-dimensional (3D) printer in order to accommodate the complex geometry of the shielding device surfaces and structure. The shielding device walls and surfaces (e.g., of upper and lower regions 240, 260 and of base plate 220) and walls of the optical and radar chambers may be covered with a radiation-absorbent material (RAM) or coating which is configured for a specific radar operating frequency. The radiation-absorbent material or coating may be any conventional or other material or coating at least partially absorbing electromagnetic energy. By way of example, the radiation-absorbent material may be Arc Technologies DD-11393.

The dimensions of the shielding device as well as the back and bottom-facing features may be varied according to packaging needs. The various surfaces of the shielding device may be configured to support a variety of radar types. The materials for constructing the shielding device preferably have a high dielectric constant, and low permeability. By way of example, the shielding device may be constructed of a Polyetherketoneketone (PEKK)-based, electrostatic discharge (ESD) compliant thermoplastic, such as Stratasys Antero 840CN03. Three-dimensional (3D) printing of the shielding device enables smooth, 3D-contoured geometry that reduces scattering of the radar signal lobes without adding significant manufacturing cost. Further, the use of an electrostatic discharge (ESD) compliant material prevents the possibility of the shielding device causing an electrostatic discharge (ESD) event that could damage system electronics.

Figure 4:
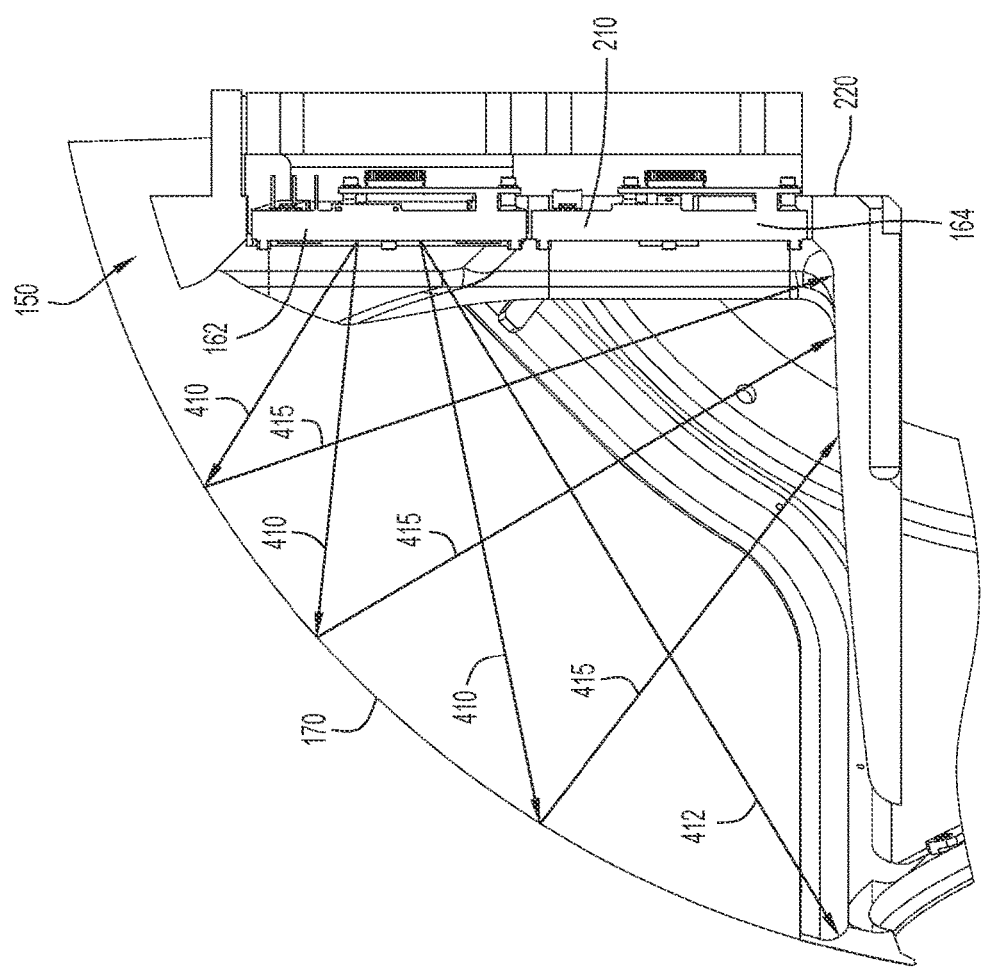
FIG. 4 is a partial side view in perspective of the housing of FIG. 1 showing the shielding device reflecting transmitted signals according to an embodiment of the present disclosure.

Base panel 220 reduces the chances of any transmit energy reaching electronics of the optical system located below the radar system as illustrated, by way of example, in FIG. 4. Initially, shielding device 150 is attached to antenna assembly 160 within radar chamber 110 as described above. Transmit antenna 162 within upper antenna aperture 242 of shielding device 150 emits radio frequency (RF) signals 410, 412 from radar system 115 toward radome 170. Signals 410, 412 (e.g., as viewed in FIG. 4) represent corners of main beam and sidelobe energy as the signals intersect with the radome. Signal 412 is directed outside the confines of radome 170 and, therefore, would not likely be reflected back to cause damage to the optical system. However, signals 410 are reflected by radome 170 back into the radar chamber forming reflected signals 415. The base panel includes dimensions sufficient to capture and absorb reflected signals 415.

The walls of shielding device 150 proximate transmit antenna 162 and receive antenna 164 (e.g., side walls, 244, 246, 264, 266, top walls 248, 268, 270, and bottom wall 272) are preferably angled at forty-five degrees relative to an axis perpendicular to the respective upper and lower antenna apertures as described above. This angled feature surrounding the profile of the antennas provides a smooth surface transition from an antenna edge to surrounding materials, provides a gradual impedance boundary transition, and connects to ground plane extension regions of the shielding device further out from the transmit and receive antennas (e.g., surfaces 254, 256, 258, 274, 276, 278, and 280 preferably angled at seventy-five degrees).

If the proximate walls were in the same plane as the transmit and receive antennas, any return energy not captured by the receive antenna would scatter at the same angle of arrival and none of that return energy would scatter into the receive antenna. The gap between the antenna plane of the radar system and the radome is sealed to prevent energy from scattering into the rest of the system and enable function of the optical system. Due to the geometric constraints of the payload, material from the shielding device must be present in front of the antenna plane to seal the gap to the radome. The angle of the proximate walls, by way of example, is forty-five degrees with respect to a receive axis of the receive antenna. The proximate walls are slightly ahead of the antenna plane and, therefore, reflect a small amount of energy towards the receive antenna. This energy is received at nearly the same time as the return energy being received directly by the receive antenna, and should not affect radar function.

The particular angle for the proximate walls in a configuration also impedes unwanted receive energy (e.g., interference signals, signals other than return signals, etc.) from entering the antenna. This directs any unabsorbed energy away from the receive antenna as illustrated, by way of example, in FIGS. 5 and 6.

Figure 5:
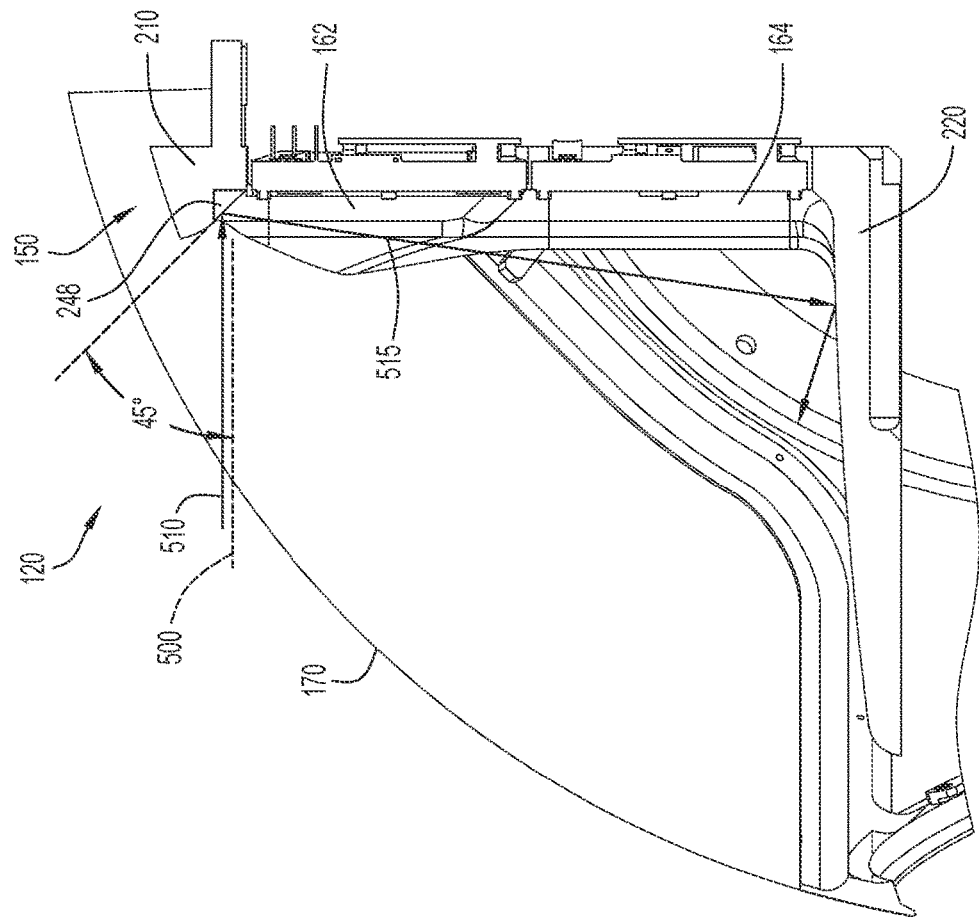
FIG. 5 is a partial side view in perspective of the housing of FIG. 1 showing an angular wall of the shielding device reflecting return signals according to an embodiment of the present disclosure.

Referring to FIG. 5, shielding device 150 is attached to antenna assembly 160 within radar chamber 110 as described above. Transmit antenna 162 within upper antenna aperture 242 of shielding device 150 emits radio frequency (RF) signals from the radar system, and a return signal 510 is directed toward radome 170. Signal 510 traverses the radome and impacts top wall 248 adjacent transmit antenna 162. Top wall 248 preferably extends at an angle of forty-five degrees relative to an axis 500 (e.g., perpendicular to transmit antenna 162). Top wall 248 partially absorbs and reflects signal 510 to form reflected signal 515. The reflected signal is directed toward base panel 220 and away from receive antenna 164, thereby preventing unwanted energy from entering and possibly corrupting results of the radar system.

Figure 6:
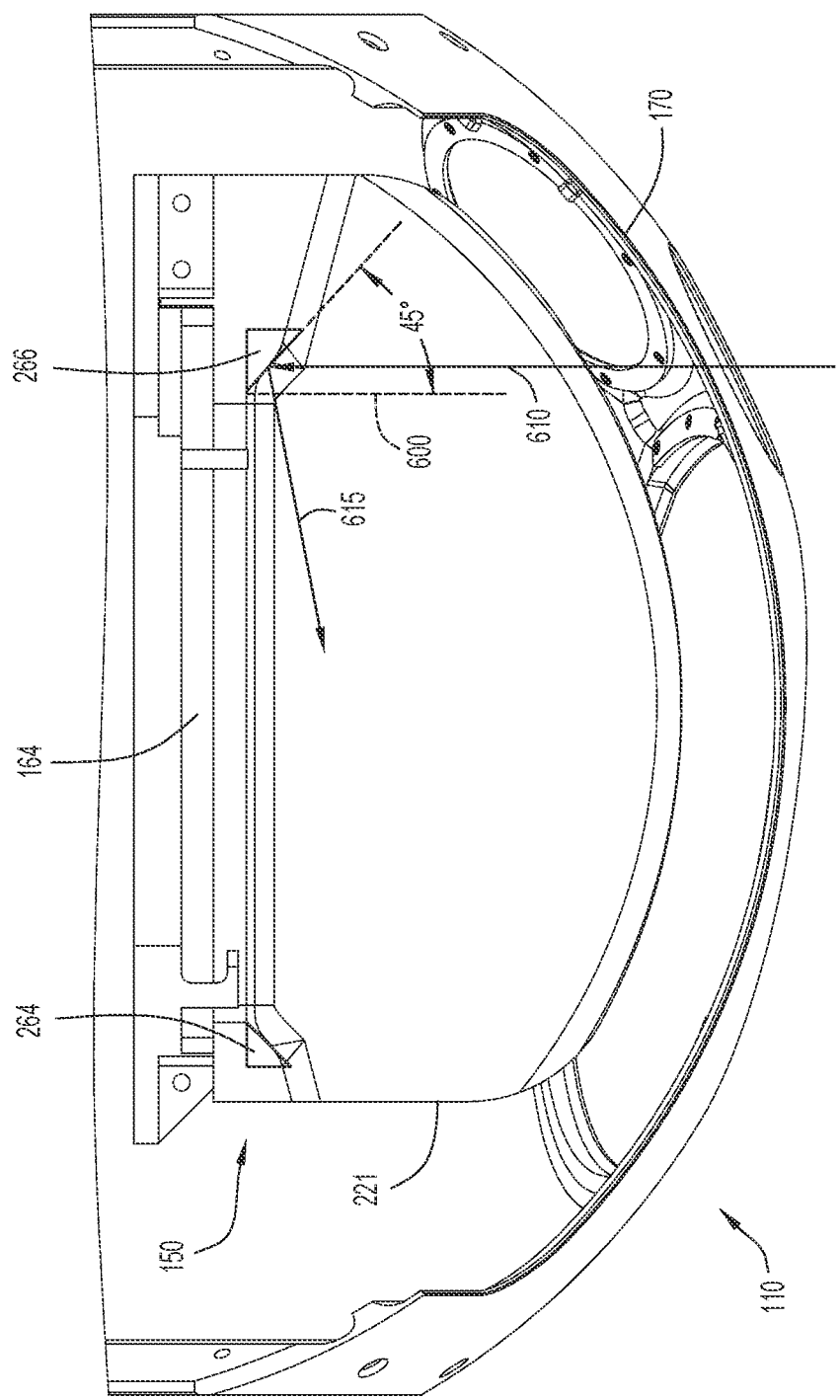
FIG. 6 is a top view in perspective of the housing of FIG. 1 showing another angular wall of the shielding device reflecting return signals according to an embodiment of the present disclosure.

As illustrated in FIG. 6, shielding device 150 is attached to antenna assembly 160 within radar chamber 110 as described above. Transmit antenna 162 within upper antenna aperture 242 of shielding device 150 emits radio frequency (RF) signals from the radar system, and a return signal 610 is directed toward radome 170. Signal 610 traverses the radome and impacts side wall 266 adjacent receive antenna 164. Side wall 266 preferably extends at an angle of forty-five degrees relative to an axis 600 perpendicular to receive antenna 164. Side wall 266 partially absorbs and reflects signal 610 to form reflected signal 615. The reflected signal is directed in a direction toward side edge 221 of base panel 220 and away from receive antenna 164, thereby preventing unwanted energy from entering and possibly corrupting results of the radar system. The other proximate walls (e.g., side walls, 244, 246, 264, top walls 268, 270, and bottom wall 272) operate in a similar manner to reflect unwanted energy away from receive antenna 164.

Surfaces of shielding device 150 roll or fan outwards with a goal of having these surfaces as normal to reflected energy entering the radar chamber as possible (e.g., surfaces 254, 256, 258, 274, 276, 278, and 280 preferably angled at seventy-five degrees). The transitions between the roll or fan out of the shielding device surfaces (e.g., ridges 245, 247, 249, 261, 263, 265, and 267) are designed to reduce scattering. If these transitions are implemented as sharp corners, there would be a high risk of scattered energy entering the receive antenna at a different time as the return energy being received which would degrade radar system performance. The shielding device surfaces extend the antenna array ground plane for the installed transmit and receive antennas and shield sensors of the optical system from reflected radio frequency (RF) energy entering through the radome as illustrated, by way of example, in FIGS. 7 and 8.

Figure 7:
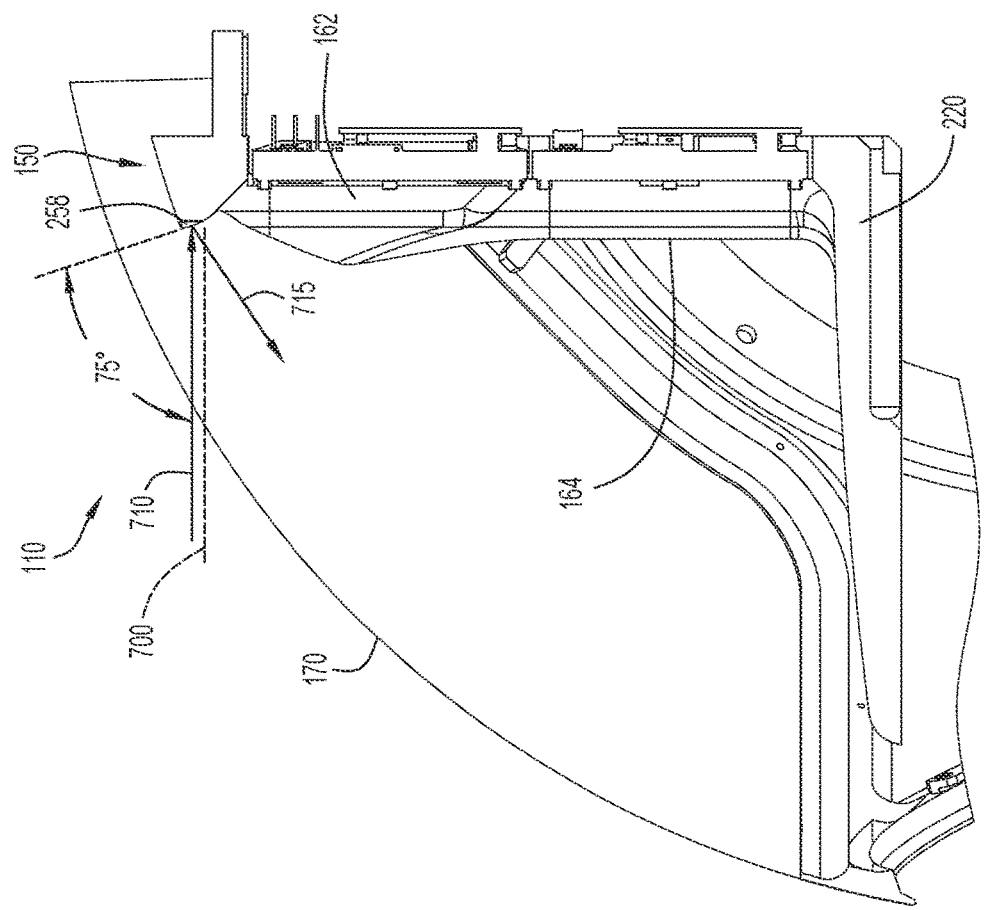
FIG. 7 is a partial side view in perspective of the housing of FIG. 1 showing an angular surface of the shielding device reflecting return signals according to an embodiment of the present disclosure.

Referring to FIG. 7, shielding device 150 is attached to antenna assembly 160 within radar chamber 110 as described above. Transmit antenna 162 within upper antenna aperture 242 of shielding device 150 emits radio frequency (RF) signals from the radar system, and a return signal 710 is directed toward radome 170. Signal 710 traverses the radome and impacts upper region surface 258 near transmit antenna 162. Upper region surface 258 preferably extends at an angle of seventy-five degrees relative to an axis 700 (e.g., perpendicular to transmit antenna 162). Upper region surface 258 partially absorbs and reflects signal 710 to form reflected signal 715. The reflected signal is directed in a direction toward base panel 220 and away from receive antenna 164, thereby preventing unwanted energy from entering and possibly corrupting results of the radar system.

Figure 8:
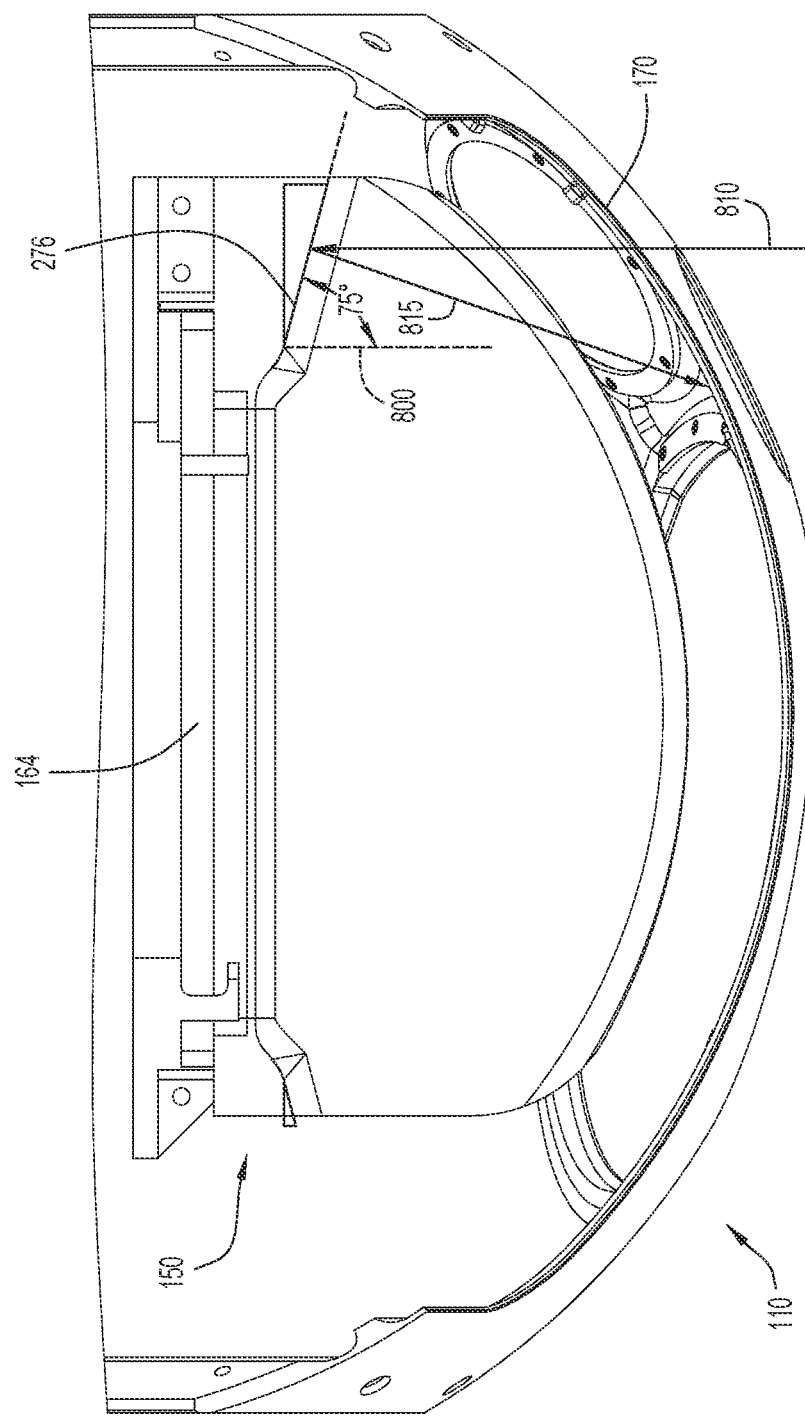
FIG. 8 is a top view in perspective of the housing of FIG. 1 showing another angular surface of the shielding device reflecting return signals according to an embodiment of the present disclosure.

As illustrated in FIG. 8, shielding device 150 is attached to antenna assembly 160 within radar chamber 110 as described above. Transmit antenna 162 within upper antenna aperture 242 of shielding device 150 emits radio frequency (RF) signals from the radar system, and a return signal 810 is directed toward radome 170. Signal 810 traverses the radome and impacts lower region surface 276 near receive antenna 164. Lower region surface 276 preferably extends at an angle of seventy-five degrees relative to an axis 800 (e.g., perpendicular to receive antenna 164). Lower region surface 276 partially absorbs and reflects signal 810 to form reflected signal 815. The reflected signal is directed toward radome 170 and away from receive antenna 164, thereby preventing unwanted energy from entering and possibly corrupting results of the radar system. The other surfaces (e.g., surfaces 254, 256, 274, 278, and 280 preferably angled at seventy-five degrees) operate in a similar manner to reflect unwanted energy away from receive antenna 164.

Figure 9:
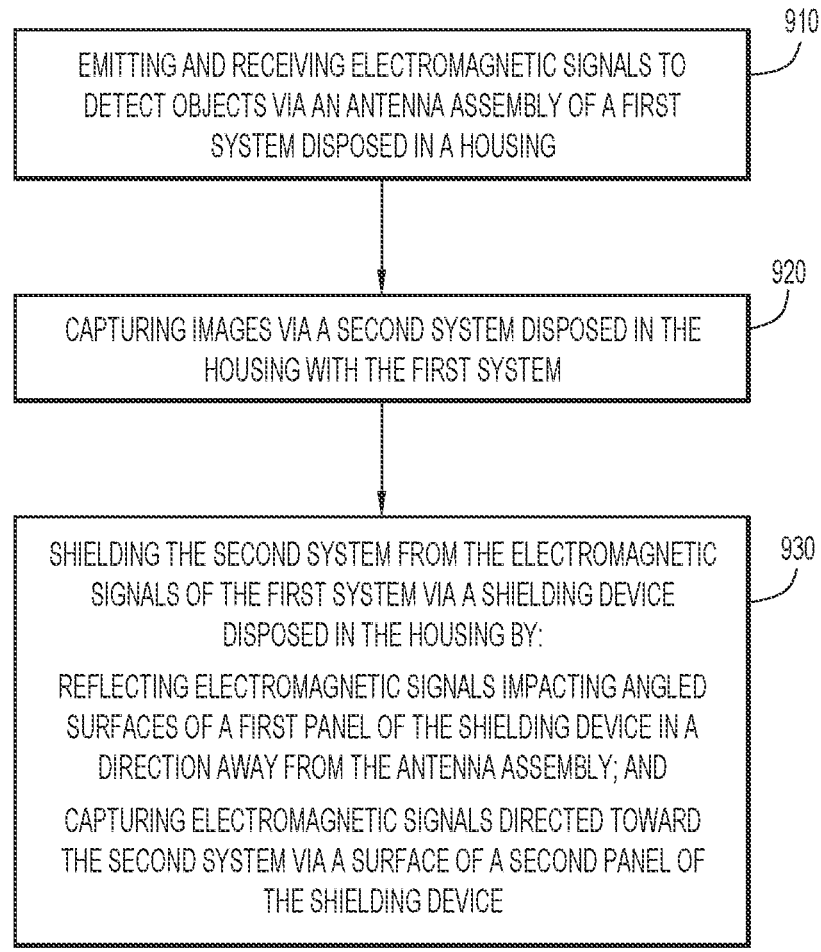
FIG. 9 is a flowchart illustrating an example manner of protecting components from electromagnetic energy according an embodiment of the present disclosure.

An example manner of protecting components from electromagnetic energy is illustrated in FIG. 9. Electromagnetic signals are emitted and received to detect objects by an antenna assembly of a first system disposed in a housing at operation 910. Images are captured at operation 920 via a second system disposed in the housing with the first system. The second system is shielded from the electromagnetic signals of the first system via a shielding device disposed in the housing at operation 930. This may be accomplished by reflecting electromagnetic signals impacting angled surfaces of a first panel of the shielding device in a direction away from the antenna assembly, and capturing electromagnetic signals directed toward the second system via a surface of a second panel of the shielding device. In this fashion, the first system may operate without the electromagnetic signals damaging components of the second system.

The embodiments have been described in the context of a radar system and an optical system, by way of example only. It is understood that the embodiments apply equally well to other environments in which a system emitting electromagnetic or other harmful energy is co-located with another system in a common housing, compartment, or chamber. For example, embodiments may protect another system that may be damaged by electromagnetic energy having a minimum power level of approximately 100V/m in the microwave frequency range.

The housing may be of any shape, constructed of any suitable materials, and include any quantity of chambers or systems arranged in any desired fashion. The housing may include (or be part of) any conventional or other gimbal having any degrees of freedom. The radar system may be implemented by any conventional or other type of radar system emitting radio frequency (RF) or other electromagnetic signals (e.g., synthetic aperture radar (SAR), etc.) to detect any types of objects. Alternatively, the shielding device may be used with any detection or other system emitting radio frequency (RF) or other electromagnetic signals. The radome may be of any quantity, shape or size, and may be disposed at any locations. The radome may be implemented by any conventional or other radome, and may be constructed of any materials enabling traversal by electromagnetic energy. The optical system may be implemented by any conventional or other passive or active optical system with sensors and components (e.g., cameras, receivers, transmitters, etc.) configured for light energy in the visible and/or non-visible spectrum (e.g., optical/camera system, electro-optical/infra-red system (EOIR), infra-red system, etc.)).

The shielding device may be used with any quantity of systems emitting electromagnetic or other harmful energy to protect another system from that energy. The shielding device may be of any shape or size, and be secured at any orientation to any suitable structures of the radar system (or other system emitting electromagnetic energy), optical system, gimbal, and/or housing in a manner providing motion in various degrees of freedom. For example, the shielding device preferably has dimensions less than an area in the radar chamber to prevent contact of the shielding device with chamber walls and enable operation of the gimbal to maintain an orientation of the shielding device and radar system. The shielding device preferably has a smooth surface with rounded transitions (e.g., no or a minimal amount of corners) to prevent scattering of electromagnetic energy.

The antenna engaging panel may be of any quantity, shape or size, and may be secured or attached to any component of the radar system (or other system emitting electromagnetic energy), optical system, gimbal, and/or housing in any desired manner. The walls and surfaces of the antenna engaging panel may be of any shape or size, oriented at any suitable angles to reflect electromagnetic energy, and may extend in any suitable directions for any distances. The antenna aperture (and upper and lower antenna apertures) may of any shape or size to receive any quantity of any type of antenna. The antenna aperture (and upper and lower antenna apertures) may be defined at any location within the antenna engaging panel. Any portions (e.g., of walls, surfaces, etc.) of the housing or antenna engaging panel may be covered by a radiation-absorbent material or coating.

The base panel may be of any quantity, shape or size, and may be secured or attached in any desired manner to the antenna engaging panel at any desired angle relative to the antenna engaging panel. The surface of the base panel may be of any shape or size. Any portions (e.g., of edges, surfaces, etc.) of the base panel may be covered by a radiation—absorbent material or coating.

The shielding device may be constructed of any suitable materials (e.g., high dielectric constant, low permeability materials, thermoplastic, etc.), and by any processes (e.g., three-dimensional (3D) printing, manufacturing machinery, etc.). The radiation-absorbent material or coating may be any conventional or other material or coating at least partially absorbing electromagnetic energy.

In summary, in one aspect, an apparatus is provided. The apparatus comprises a first system including an antenna assembly to emit and receive electromagnetic signals to detect objects. The first system is disposed in a housing. A second system of the apparatus captures images and is disposed in the housing with the first system. A shielding device of the apparatus shields the second system from the electromagnetic signals of the first system. The shielding device is disposed in the housing and includes a first panel including a plurality of angled surfaces to reflect electromagnetic signals impacting the angled surfaces in a direction away from the antenna assembly, and a second panel including a surface to capture electromagnetic signals directed toward the second system.

In another aspect, a method is provided. The method comprises emitting and receiving electromagnetic signals to detect objects via an antenna assembly of a first system disposed in a housing, capturing images via a second system disposed in the housing with the first system, and shielding the second system from the electromagnetic signals of the first system via a shielding device disposed in the housing. Shielding the second system comprises reflecting electromagnetic signals impacting angled surfaces of a first panel of the shielding device in a direction away from the antenna assembly, and capturing electromagnetic signals directed toward the second system via a surface of a second panel of the shielding device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
a first system including an antenna assembly to emit and receive electromagnetic signals to detect objects, wherein the first system is disposed in a housing;
a second system for capturing images, wherein the second system is disposed in the housing with the first system; and
a shielding device for shielding the second system from the electromagnetic signals of the first system, wherein the shielding device is disposed in the housing and includes:
a first panel including an aperture and a plurality of angled surfaces to reflect electromagnetic signals impacting the angled surfaces in a direction away from the antenna assembly, wherein the aperture is configured to receive one or more antennas of the antenna assembly; and
a second panel including a surface to absorb electromagnetic signals directed toward the second system, wherein the second panel is attached to a portion of the first panel outside the aperture and extends from the first panel in a direction of an axis perpendicular to the first panel.

2. The apparatus of claim 1, wherein the first system includes a radar system.

3. The apparatus of claim 2, wherein the radar system includes a synthetic aperture radar system.

4. The apparatus of claim 1, wherein the second system includes an optical system.

5. The apparatus of claim 4, wherein the optical system includes an electro-optical/infra-red system.

6. The apparatus of claim 1, wherein a plurality of surfaces of the first and second panels are covered with a radiation-absorbent material.

7. The apparatus of claim 1, wherein the aperture is defined by a plurality of walls each extending at an angle in a range of thirty-five to fifty-five degrees.

8. The apparatus of claim 7, wherein the first panel further includes a plurality of surfaces extending from the plurality of walls at an angle in a range of sixty-five to ninety degrees.

9. The apparatus of claim 8, wherein a ridge is defined in the first panel at each junction where the plurality of walls meet the plurality of surfaces to transition between different angles of the plurality of walls and plurality of surfaces.

10. The apparatus of claim 1, wherein the shielding device is mounted to the antenna assembly.

11. A method comprising:
emitting and receiving electromagnetic signals to detect objects via an antenna assembly of a first system disposed in a housing;
capturing images via a second system disposed in the housing with the first system; and
shielding the second system from the electromagnetic signals of the first system via a shielding device disposed in the housing, wherein shielding the second system further comprises:
reflecting electromagnetic signals impacting angled surfaces of a first panel of the shielding device in a direction away from the antenna assembly, wherein the first panel includes an aperture to receive one or more antennas of the antenna assembly; and
absorbing electromagnetic signals directed toward the second system via a surface of a second panel of the shielding device, wherein the second panel is attached to a portion of the first panel outside the aperture and extends from the first panel in a direction of an axis perpendicular to the first panel.

12. The method of claim 11, wherein the first system includes a radar system.

13. The method of claim 12, wherein the radar system includes a synthetic aperture radar system.

14. The method of claim 11, wherein the second system includes an optical system.

15. The method of claim 14, wherein the optical system includes an electro-optical/infra-red system.

16. The method of claim 11, wherein a plurality of surfaces of the first and second panels are covered with a radiation-absorbent material.

17. The method of claim 11, wherein the aperture is defined by a plurality of walls each extending at an angle in a range of thirty-five to fifty-five degrees.

18. The method of claim 17, wherein the first panel further includes a plurality of surfaces extending from the plurality of walls at an angle in a range of sixty-five to ninety degrees.

19. The method of claim 18, wherein a ridge is defined in the first panel at each junction where the plurality of walls meet the plurality of surfaces to transition between different angles of the plurality of walls and plurality of surfaces.

20. The method of claim 11, wherein the shielding device is mounted to the antenna assembly.

* * * * *